United States Patent Office 3,389,047
Patented June 18, 1968

3,389,047
TREATMENT OF COVERPLATES FOR GLASS LAMINATES
Edward Lavin, Longmeadow, and George E. Mont, Springfield, Mass., assignors to Monsanto Company, St. Louis, Mo., a corporation of Delaware
No Drawing. Filed Oct. 20, 1965, Ser. No. 499,030
8 Claims. (Cl. 161—199)

This invention relates to improved laminated safety-glass. More particularly, this invention relates to a process for treating glass coverplates used in laminates so as to produce a laminated safety-glass which has higher resistance to penetration.

Laminated safety-glass comprises two or more glass sheets bound with an interlayer of a transparent, adherent plastic. The usual glass sheet is plate glass or tempered glass of varying thicknesses. The usual plastic interlayer is a plasticized polyvinyl acetal resin formed in a sheet or film with a thickness of about 0.015 inch or more. The major commercial use of these safety-glass compositions is for automobile windshields, as well as for windshields in other moving vehicles. The ever-increasing number of automobiles and the faster speed of travel today, coupled with the greater area of modern day windshields, has accentuated the need for improved laminated safety-glass. These structures must not only help protect persons in a car from being struck by flying objects from the outside but should prevent occupants from penetrating the windshield on impact after a sudden stop. The danger of being cut by glass in the windshield can occur not only when a body strikes the windshield and penetrates it but also when the windshield is broken and glass fragments are released. The glass laminates must be constructed so as to minimize the danger of flying glass after impact. In addition, the glass laminate should be capable of absorbing energy on impact, thereby decreasing the possibility of skull fracture which may occur when a head strikes the windshield, while also supplying added resistance to penetration.

To date no improvements in the impact strength of glass laminates has been achieved by treatment of the glass members of the laminate. Rather, emphasis in improving impact resistance in laminated safety-glass has been directed to the interlayer material, chiefly by adjusting the titer level of the polyvinyl butyral interlayer with various salts. However, this method has certain drawbacks in that some salts cause discoloration when present in quantities sufficient to increase the impact strength to a desirable level. Some salts may also be sensitive to moisture within the laminate, which sensitivity may result in edge delamination. Furthermore, the use of salts in the interlayer to control impact strength may necessitate two separate production facilities to produce interlayer material for applications which cannot tolerate the presence of added salt. Thus, it can be seen that a need exists for a glass laminate with improved impact strength which is obtained by treating the glass members of the laminate rather than the interlayer.

The principal object of this invention is to provide laminated safety-glass having improved safety features.

A further object of this invention is to provide a laminated safety-glass having improved resistance to penetration by impacting objects such as the human head.

A particular object of this invention is to provide improved physical properties in laminated safety-glass.

A further object is to provide a novel glass member for laminates in order to accomplish the above objects.

Another object of this invention is to provide a novel process for treating the glass member of the laminates in order to accomplish the preceding objects.

These and other objects are accomplished by the process for improving the impact strength of laminated safety-glass which comprises immersing at least one glass member of the laminate in a basic solution, washing the glass with water, drying the glass and then laminating the glass to an interlayer, wherein the basic solution is selected from the group consisting of solutions of the hydroxides of alkali and alkaline earth metals, wherein the concentration of the solution is at least 0.001 N.

The following examples are given in illustration of the invention and are not intended as limitations thereof. All parts and percentages are by weight unless otherwise specified.

Example I is set forth as a control to better illustrate the improved impact strength that one achieves in the practice of this invention.

Example I

This example uses a conventional polyvinyl acetal interlayer for safety-glass. It is a polyvinyl butyral containing 18.8% vinyl alcohol by weight and having an alkalinity titer of 20. This titer is due to the presence of potassium acetate (K acetate) in the polyvinyl butyral. The resin is plasticized with 44 parts of triethylene glycol di(2-ethyl butyrate) per hundred parts of resin and has a moisture content of about 0.4%. The interlayer is formed into sheets 0.015 inch thick (15 gauge) and 0.030 inch thick (30 gauge). These interlayer sheets are used as controls.

Sets of ten glass laminates are individually prepared by interposing the 15 gauge interlayer between two 24 x 36 x 0.125 inch glass sheets and the 30 gauge interlayer between two 12 x 12 x 0.125 inch glass sheets. These glass sheets are scrubbed up to one minute under tap water at from 10 to 50° C., allowed to drain for one hour at room temperature and then vacuum dried at 40° C. and 15 mm. of Hg. The resulting laminates are then subjected to a temperature of about 275° F. at a pressure of 185 p.s.i. for approximately 10 minutes to bond the laminate or panels together.

The laminates prepared by the above procedure are then subjected to Mean Break Height tests according to the recently established tentative specifications set up by the Society of Automotive Engineers, the Subcommittee on Automotive Glazing and the results reported below.

In essence, the Mean Break Height test comprises placing the laminate in a horizontal position with a frame or edge support and while maintaining a constant laminate temperature, which is 70° F. in this series, allowing a 22 pound spherical ball (referred to as a head form) to drop from a designated height against approximately the middle of the laminate made with the 15 gauge interlayer. This test is repeated at increasing ball-drop heights to determine the approximate height in feet at which 50% of the laminates tested will resist penetration. In other words, the Mean Break Height of a laminate is a measure of the ability of that laminate to absorb the energy of an impacting object. The same test is used with the laminates made with 30 gauge interlayer except that a 5 pound steel ball is used on the smaller laminate.

These laminates were found to have a Mean Break Height of 2.3 and 7.0 feet when using 15 and 30 gauge interlayers respectively.

The following examples are set forth to illustrate how the impact strength of glass laminates may be improved by the treatment of the glass members of the laminate in the practice of this invention. The interlayer used in these examples is the same as that used in Example I. After treatment, the glass sheets are rinsed and dried in the same manner as the glass sheets in Example I and the laminates are made and tested according to the procedures set forth in Example I.

Example II

Example I is repeated here using glass sheets which are immersed in a 0.5 N solution of potassium hydroxide for the times specified.

|  | Mean Break Height (Feet) | |
| --- | --- | --- |
|  | 15 Guage [1] | 30 Guage |
| Hours in 0.5 N KOH at 25° C.: | | |
| 5 | 2.4 | 9.7 |
| 24 | 2.8 | 12.1 |
| 68 | 3.7 | 14.0 |

[1] Thickness of interlayer.

A noticeable increase in impact strength is achieved when the glass is treated as above versus the untreated glass of Example I.

Example III

Example I is repeated here using glass sheets which are immersed in a 1.0 N solution of potassium hydroxide for the times specified.

|  | Mean Break Height (Feet) | |
| --- | --- | --- |
|  | 15 Guage | 30 Guage |
| Hours in 1.0 N KOH at 25° C.: | | |
| 7 | 2.4 | 10.0 |
| 24 | 2.7 | 11.6 |
| 68 | 3.5 | 13.8 |

As in the previous example, a noticeable increase in impact strength is achieved when the glass sheets are treated versus the untreated glass of Example I. However, in this example no noticeable increase in impact strength over those laminates of Example II is obtained by going from a 0.5 N to a 1.0 N potassium hydroxide solution.

Example IV

Example III is repeated here but using a 2.0 N solution of potassium hydroxide instead of the 1.0 N solution of Example III with substantially the same results. This indicates that the concentration of the basic solution is not as big a factor as either time or temperature in increasing impact strength.

The foregoing Examples II-IV illustrate that the increase in impact strength may be controlled by the length of time that glass is immersed in the basic solution more than by the concentration of the solution.

Example V

Example III is repeated here using glass sheets which are immersed in a 1.0 N solution of potassium hydroxide at 50° C.

|  | Mean Break Height (Feet) | |
| --- | --- | --- |
|  | 15 Guage | 30 Guage |
| Hours in 1.0 N KOH at 50° C.: | | |
| 1 | 2.5 | 9.8 |
| 5 | 3.1 | 12.7 |

This example, when compared with the results of Example III, illustrates that an increase in impact strength comparable to that achieved in Examples II-IV may be achieved in a shorter time by increasing the temperature of the alkali solution.

Example VI

Example I is repeated here but using glass sheets which are immersed in 0.005 N sodium hydroxide at temperatures of 85° C. for 6 hours with results that are equally as good as those obtained in Example V.

Example VIII

Example III is repeated but using a 1.0 N calcium hydroxide solution with results that are equally good as those obtained in Example III.

The basic solutions used to treat the glass in the practice of this invention are the hydroxides of the alkali and alkaline earth metals. Potassium and sodium hydroxides are preferred because of their low cost and availability.

This invention also contemplates the use of alcoholic solutions of alkali and alkaline earth metal hydroxides, as well as aqueous solutions and mixtures of alcoholic and aqueous solutions of these bases. The choice of alcohols used as the solvent is limited by the solubility of the particular hydroxide. In general, alcohols containing from 1 to 4 carbon atoms are preferred as the solvent in alcoholic solutions. Examples of these would include methyl, ethyl, propyl, isopropyl, butyl, isobutyl and tertiary butyl alcohols. Especially preferred are the aqueous solutions of the hydroxides of alkali and alkaline earth metals.

A possible explanation of the mechanism whereby the impact strength is increased is that the hydroxyl ions of the base react with the glass to destroy the silica structure on the surface of the coverplates. This silica structure is replaced by a silica type gel which becomes hydrated and remains on the surface. The adhesion of the interlayer to the silica type gel is reduced over the adhesion to the silica structure of untreated glass sheets. This controlled reduction in adhesion is now believed to be the reason for the increased impact strength.

The amount of reduction in adhesion varies with the length of time that the coverplates are immersed as well as with the temperature of the basic solution. The concentration of the basic solution does not appear to affect the controlled reduction in adhesion to the extent that time and temperature do.

In general, the practice of this invention contemplates using as low as 0.001 N basic solution. There appears to be no maximum concentration limit except a practical one consistent with safety in handling and cost.

The temperature of the basic solution may vary from the freezing point of the solution up to those temperatures which are at or below the dissolution temperatures of the glass. These will vary with the nature and type of the glass used. It is understood that when using temperatures greater than the boiling point of the solution, pressure vessels are required. In fact, as was pointed out above, the use of higher temperatures greatly accelerates the treatment of the coverplates.

The glass immersion time will depend upon the temperature of the solution and the desired increase in impact resistance. Examples II and III indicate that the increase in impact strength begins to level off after a certain period of time. In other words, after a certain period of immersion no substantial increase in impact strength will be achieved by continued immersion. The time required to reach this plateau where no substantial increase in impact strength is achieved will depend upon the temperature of the solution.

The invention also contemplates the treatment of only one side of the glass sheet or of particular spots or areas on either side of the glass sheet. This can be accomplished by various means such as bringing only one surface of the glass in contact with the hydroxide solution or by protecting or covering the areas which are not to be treated.

This process described in this invention is applicable to plate glass, heat temperature or chemically tempered glass of varying thickness. The choice of an interlayer for the glass laminate is wide and varied. Preferred are the polyvinyl acetal interlayers and especially preferred are the polyvinyl butyral interlayers as are well known to those skilled in the laminating art.

After the basic treatment, the glass sheet is rinsed in clear water and dried according to any of the normal procedures and fabricated into a laminate. Both the drying and laminating procedures are well-known to those skilled in the art and will not be discussed here.

Safety-glass laminates find special application in the automotive and aircraft industries for protecting passengers, both against the hazards of flying objects and to reduce injury caused by body impact against the laminate. Wherever else glass or transparent panels are utilized, such as in the building trade, the protection afforded by safety-glass has become increasingly important. The laminates of the present invention increase the advantages of utilizing safety-glass because of their improved safety performance.

It is obvious that many variations may be made in the products and processes set forth above without departing from the spirit and scope of this invention.

What is claimed is:

1. A process for improving the impact strength of laminated automotive glazing units and laminated architectural glass comprising at least two sheets of silica containing glass having an interlayer of poly(vinyl butyral) interposed between the glass sheets which process comprises
   (1) treating at least one of the glass surfaces that comes in contact with the poly(vinyl butyral) with a basic solution so as to form a silica type gel on said glass surface;
   (2) washing the treated glass surface with water;
   (3) drying the treated glass surface; and
   (4) laminating the treated glass surface directly to and in contact with said polyvinyl butyral interlayer;
wherein the basic solution is selected from the group consisting of solutions of the hydroxides of alkali and alkaline earth metals, wherein the concentration of the solution is at least 0.001 N.

2. A process as in claim 1 wherein the basic solution is a potassium hydroxide solution.

3. A process as in claim 1 wherein the basic solution is a calcium hydroxide solution.

4. A process as in claim 1 wherein the basic solution is a sodium hydroxide solution.

5. An improved glass sheet for use in laminated automotive glazing units and architectural laminates which comprises at least two silica containing glass sheets having an interlayer of poly(vinyl butyral) interposed between and in direct contact with the glass sheets; wherein at least one of the surfaces of the glass sheet that is in direct contact with the poly(vinyl butyral) interlayer has been treated with a basic solution so as to form a silica type gel on the treated glass surface and wherein the basic solution is selected from the group consisting of solutions of hydroxides of alkali and alkaline earth metals, wherein the concentration of the solution is at least 0.001 N.

6. An improved glass sheet as in claim 5 wherein the basic solution is a potassium hydroxide solution.

7. An improved glass sheet as in claim 5 wherein the basic solution is a calcium hydroxide solution.

8. An improved glass sheet as in claim 5 wherein the basic solution is a sodium hydroxide solution.

References Cited

UNITED STATES PATENTS

| | | | |
|---|---|---|---|
| 2,779,136 | 1/1957 | Hood et al. | 161—192 |
| 2,924,485 | 1/1960 | Miles | 161—199 |
| 2,946,711 | 7/1960 | Bragaw et al. | 161—199 |
| 3,231,461 | 1/1966 | Mattimoe | 161—199 |

OTHER REFERENCES

M. E. Nordberg et al., Strengthening by Ion Exchange., Jour. American Ceramic Society, 47 No. 5, May 1964, pp. 215–219.

ROBERT F. BURNETT, *Primary Examiner.*

ALEXANDER WYMAN, *Examiner.*

W. J. VAN BALEN, *Assistant Examiner.*